UNITED STATES PATENT OFFICE.

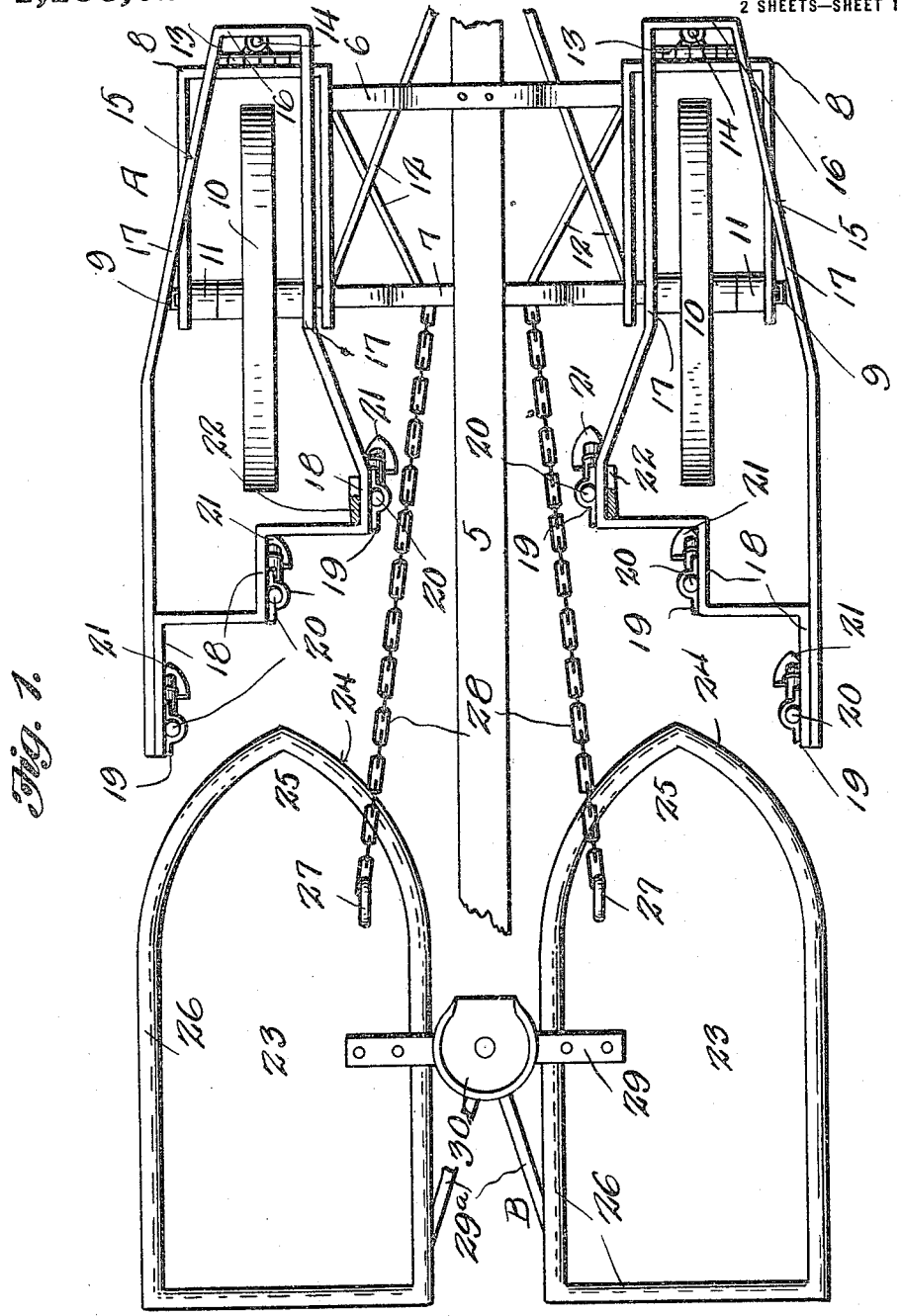

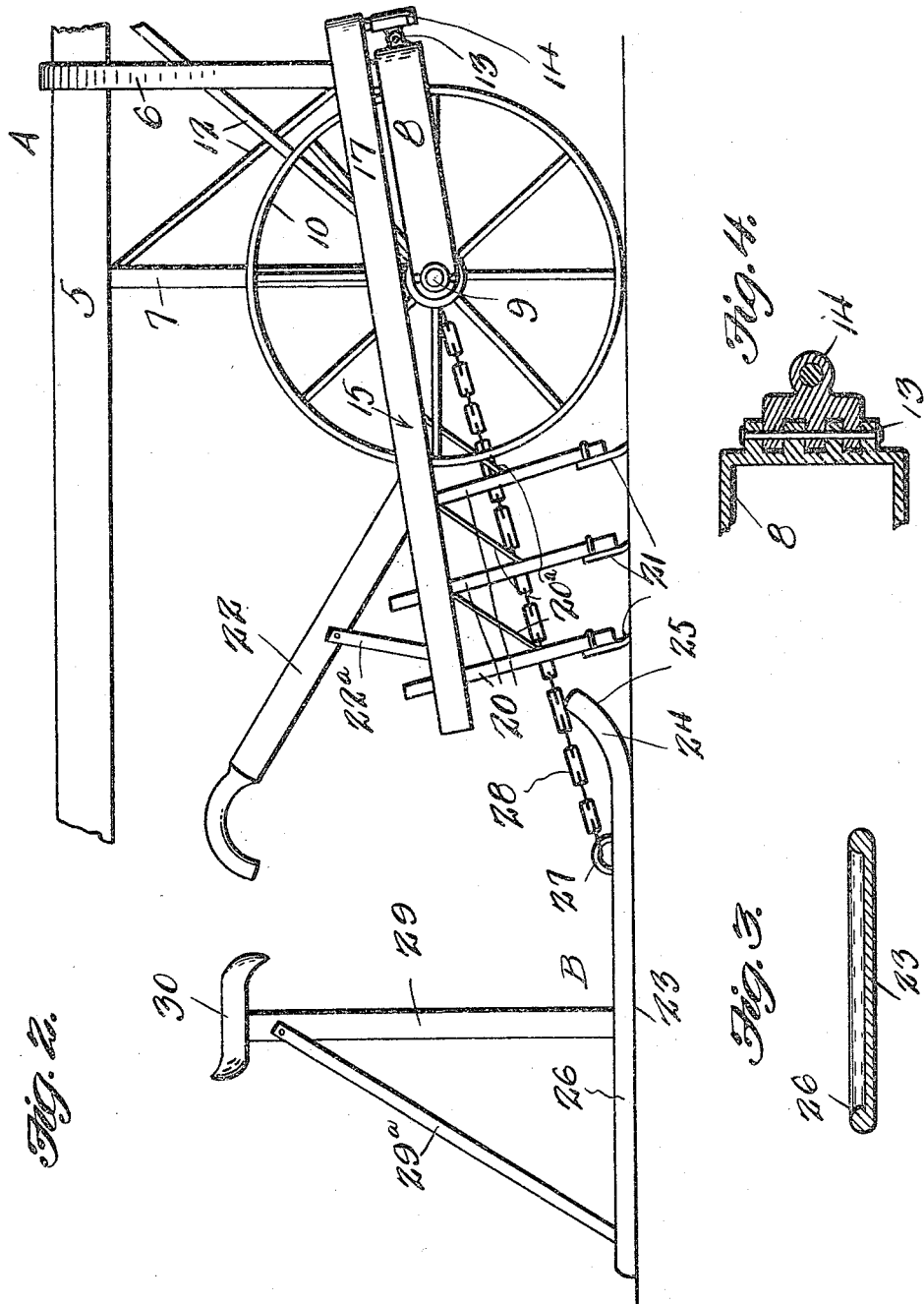

HENRY STEINFORT, OF ALIDA, KANSAS.

COMBINED CULTIVATOR AND DRAG.

1,138,024.  Specification of Letters Patent.  Patented May 4, 1915.

Application filed August 11, 1914. Serial No. 856,181.

*To all whom it may concern:*

Be it known that I, HENRY STEINFORT, a citizen of the United States, residing at Alida, in the county of Geary and State of Kansas, have invented certain new and useful Improvements in Combined Cultivators and Drags, of which the following is a specification.

The present invention relates to new and useful improvements in a combined cultivator and drag.

The primary object of the invention is the provision of a cultivator of novel construction, and a drag, together with a connecting means by which the said drag can be attached in the rear of the cultivator.

Another object of this invention is the provision of a plurality of drags for cultivators, and a connecting yoke for the drags, the latter supporting a seat for the operator of the machine.

Still another object of the invention is the provision of a cultivator, consisting of a wheeled frame, and a plurality of cultivator frames, with means for swiveling the latter to the main frame, and a plurality of connected drags adapted to ride one behind each of the cultivator frames.

A further object of this invention is the provision of a novel connection between the main frame and cultivator frames, whereby the latter will be permitted to swing both vertically and transversely of the said main frame.

A still further object of the invention is the provision of a combined cultivator and drag, which will be comparatively simple and inexpensive to manufacture, reliable and efficient in use, and readily operate.

With the above and other objects in view, the present invention resides in the novel features of construction, formations, combinations and arrangements of parts to be hereinafter more fully described, claimed and illustrated in the accompanying drawings, in which:

Figure 1 is a top plan view of my invention; Fig. 2 is a side elevation thereof; Fig. 3 is a transverse sectional view through the drag; and, Fig. 4 is a detail sectional view taken through the connecting member of the main and one of the cultivator frames.

Referring to the accompanying drawings, by similar characters of reference, throughout the several views, the numeral 5 denotes the beam of my improved cultivator A, while the drag is indicated by B. A yoke 6 passes over the forward end of this beam 5, while a similar yoke 7 is attached in any preferred manner to the under side of the said beam 5, in the rear of the point of attachment of the first mentioned yoke 6. Horizontally disposed U-shaped frames are secured to the downwardly extended terminals of the yokes 6 and 7, as clearly shown in Fig. 1, the said U-shaped frames being shown at 8. The lower terminals of the yokes 7 are disposed in horizontal alinement at 9, and upon these said horizontal portions, between the rear ends of the U-shaped frames 8, are mounted the supporting wheels 10, which are held in their normal positions by the spacing sleeves 11. The brace rods 12 relieve the frames 8 of the greater part of the strain caused by the weight of the cultivator A.

Hinge members 13 are carried by the arches of the U-shaped frames 8, and these said hinge members 13 are connected by the vertical pivots 14 to the cultivator frames 15 at the arches 16 thereof. The opposite sides 17 of these frames 15 diverge rearwardly as clearly shown in Fig. 1, while the rear ends thereof are stepped to form longitudinal supporting bars 18, to which the clamps 19 are attached in any desired manner. These clamps 19 carry the cultivator standards 20, which are equipped at their lower ends with the quickly detachable teeth 21. Handles 22 are attached to the frames 15, and held rigid thereon by the braces 22ª.

The drag B comprises a plurality of shoes 23, which are of a substantially rectangular formation as clearly shown in Fig. 1, the same being tapered at their forward ends as at 24, and curved upwardly as at 25. These shoes are provided with marginal beads 26, which brace the latter and strengthen the same both longitudinally and laterally.

Eyes 27 are formed upon the inner forward edges of the shoes 23, for engagement with the chains 28, which are connected at their forward ends to the rear arch 7, immediately in rear of the frames 15, for the purpose of smoothing and packing the soil after the cultivator has passed thereover. These shoes 23 are connected to the cultivator in such manner that either or both of them can be attached or removed at will. It is also to be understood that any number of these shoes 23 can be employed. An arched connecting member 29 is secured at its lower ends to the inner sides of the shoes 23, and is braced thereon by the rods 29ª. A seat 30 is attached to the upper extremity of this arched member for the convenience of the operator and adding increased weight to the machine, upon the said drag B.

The operator of the machine occupies the seat 30, which is positioned so that the handles 22 are within convenient reach. It will thus be seen that the operator by virtue of the connection between the frames 8 and 15, as previously described, can regulate the depth to which the teeth 21 enter the soil, or can entirely raise the same above the soil for convenience in traveling over roads, or can swing the same laterally of the main frame in either direction as becomes necessary during the operation of the machine.

The above described machine is designed especially as a corn cultivator, but it is to be understood that the same can be adapted for any other purposes to which the various parts thereof will adapt themselves. It should also be understood in this connection that various minor changes in the specific details of construction can be resorted to within the scope of the appended claims without departing from or sacrificing any of the advantages of the invention.

From the foregoing it will be obvious that a combined cultivator and drag is provided which will fulfil all the necessary requirements of such a device.

Having thus fully described this invention, what I claim as new and desire to protect by Letters Patent is:

In a device such as described, an attaching member and a pair of drags secured thereto, said drags each comprising a flat body tapered toward the forward end thereof, and having enlarged rounded edges, a connecting member attached to the drags, and a seat secured to the connecting member.

In testimony whereof I affix my signature in presence of two witnesses.

HENRY STEINFORT.

Witnesses:
A. S. BLAIR,
JOHN N. TRITLE.

Copies of this patent may be obtained for five cents each, by addressing the "Commissioner of Patents, Washington, D. C."